United States Patent [19]

Jeter

[11] Patent Number: 5,073,877
[45] Date of Patent: Dec. 17, 1991

[54] SIGNAL PRESSURE PULSE GENERATOR

[75] Inventor: John D. Jeter, St. Martinville, La.

[73] Assignee: Schlumberger Canada Limited, Calgary, Canada

[21] Appl. No.: 524,172

[22] Filed: May 16, 1990

Related U.S. Application Data

[60] Division of Ser. No. 506,453, Apr. 9, 1990, which is a continuation of Ser. No. 330,791, Mar. 30, 1989, abandoned, which is a division of Ser. No. 865,083, May 19, 1986, Pat. No. 4,825,421.

[51] Int. Cl.$^5$ .............................................. H04M 9/00
[52] U.S. Cl. .............................................. 367/84
[58] Field of Search .............................................. 367/81-84

[56] References Cited

U.S. PATENT DOCUMENTS

| | | | |
|---|---|---|---|
| Re. 29,734 | 8/1978 | Manning | 367/83 |
| Re. 30,055 | 7/1979 | Claycomb | 367/83 |
| Re. 30,246 | 4/1980 | Richter, Jr. et al. | 175/65 |
| 2,352,833 | 7/1944 | Hassler | 73/151 |
| 2,958,821 | 11/1960 | Webb | 324/166 |
| 3,065,416 | 11/1962 | Jeter | 175/40 |
| 3,309,656 | 3/1967 | Godbey | 367/85 |
| 3,705,603 | 12/1972 | Hawk | 137/624.14 |
| 3,711,825 | 1/1973 | Claycomb | 367/85 |
| 3,713,089 | 1/1973 | Claycomb | 68/210 |
| 3,736,558 | 5/1973 | Cubberly, Jr. | 367/85 |
| 3,737,843 | 6/1973 | LePeuvedic et al. | 367/85 |
| 3,756,076 | 9/1973 | Quichaud et al. | 73/151 |
| 3,764,968 | 10/1973 | Anderson | 367/84 |
| 3,764,969 | 10/1973 | Cubberly, Jr. | 367/84 |
| 3,770,006 | 11/1973 | Sexton et al. | 137/499 |
| 3,792,429 | 2/1974 | Patton et al. | 367/84 |
| 3,837,223 | 9/1974 | Richter, Jr. et al. | 73/151 |
| 3,949,354 | 4/1976 | Claycomb | 367/85 |
| 3,958,217 | 5/1976 | Spinnler | 367/83 |
| 3,982,224 | 9/1976 | Patton | 367/84 |
| 3,983,948 | 10/1976 | Jeter | 175/45 |
| 3,997,867 | 12/1976 | Claycomb | 367/83 |
| 4,078,620 | 3/1978 | Westlake et al. | 175/48 |
| 4,120,097 | 10/1978 | Jeter | 33/307 |
| 4,351,037 | 9/1982 | Scherbatskoy | 367/85 |
| 4,386,422 | 5/1983 | Mumby et al. | 367/85 |
| 4,405,021 | 9/1983 | Mumby | 175/48 |
| 4,515,225 | 5/1985 | Dailey | 175/40 |
| 4,531,579 | 7/1985 | Larronde et al. | 166/66 |
| 4,550,392 | 10/1985 | Mumby | 367/82 |
| 4,655,289 | 4/1987 | Schoeffler | 166/320 |
| 4,802,150 | 1/1989 | Russell et al. | 367/85 |
| 4,825,421 | 4/1989 | Jeter | 367/83 |
| 4,914,637 | 4/1990 | Goodsman | 367/83 |

Primary Examiner—Brian S. Steinberger
Attorney, Agent, or Firm—John J. Ryberg

[57] ABSTRACT

A mechanical oscillator driven by drilling fluid flow pumped down a drill string bore is combined with sensors and controls to produce a downhole drilling fluid pressure pulse generator for use in drill strings for Measurement While Drilling (MWD) pipe bore telemetry.

A fluid flow responsive valve designed to be put in continual motion by fluid flow is associated with a motion stop lock so that, on release, a discrete digital fluid pressure change is generated. A downhole instrument package controls the lock release in a timed sequence, so that a series of pressure changes represent information to be decoded at the earth surface to determine downhole parameters sensed by the instrument package.

The active elements of the downhole system may be installed in the drill string or lowered as a shuttle package down the drill bore.

The fluid pressure pulse generating apparatus can be classified as a fluid flow excited oscillator or an auto-cycling pulse generator.

Controls are provided to enable the auto-cycling valve to respond to electric signals from downhole instruments to generate code messages by digital pulse, change-of-state in valved flow resistance and frequency change in standing wave pressure pulses.

17 Claims, 6 Drawing Sheets

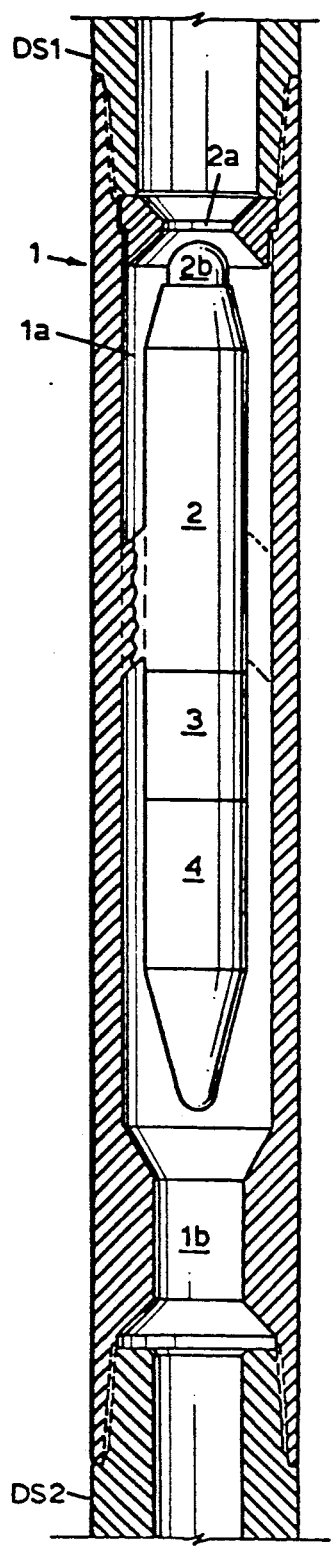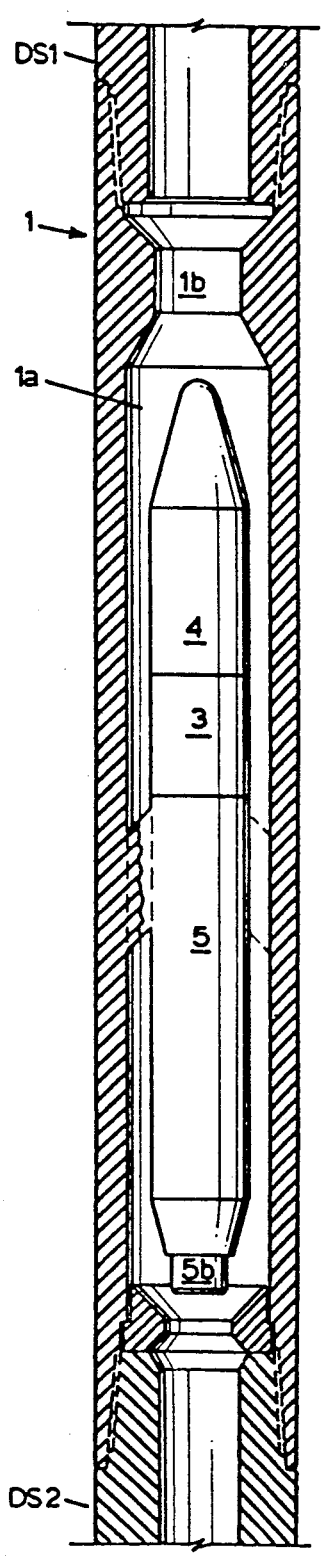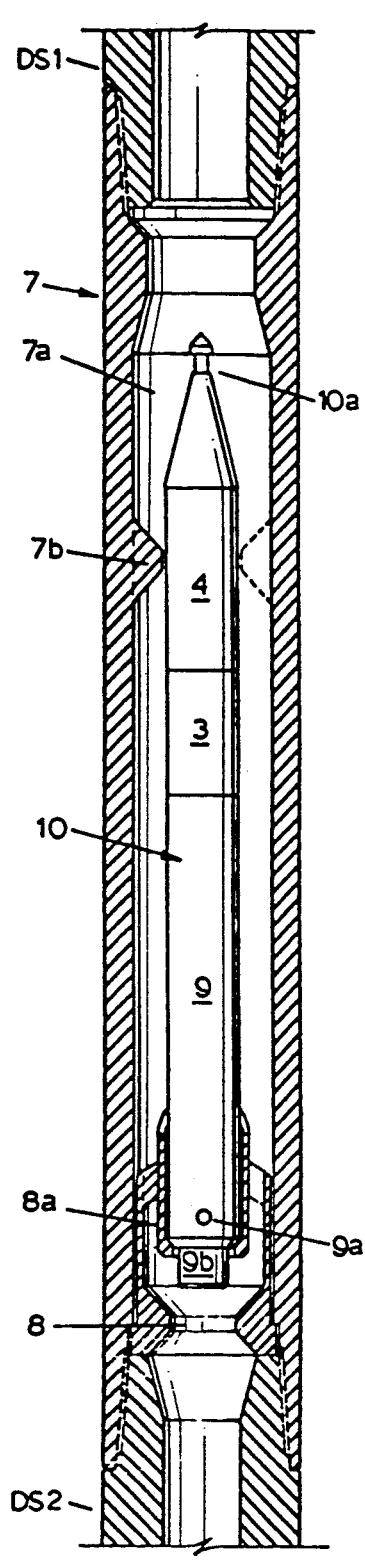

FIG. 6
FIG. 7
FIG. 8
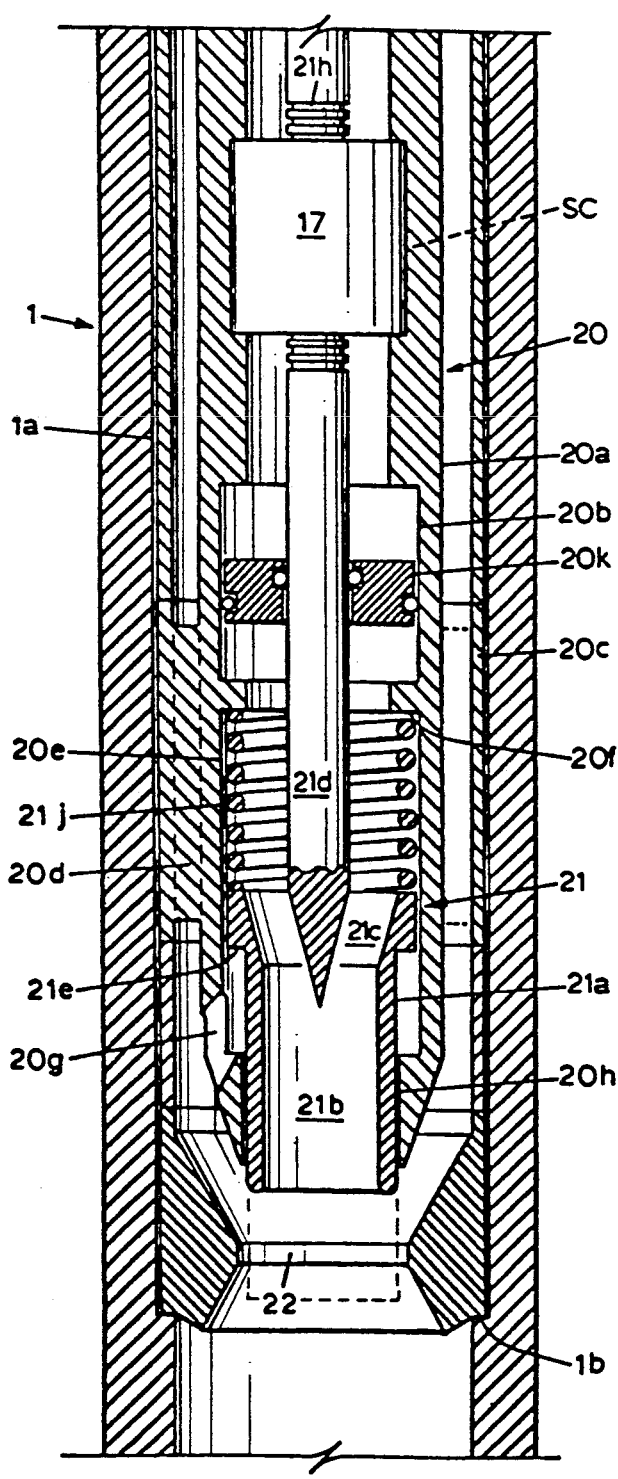
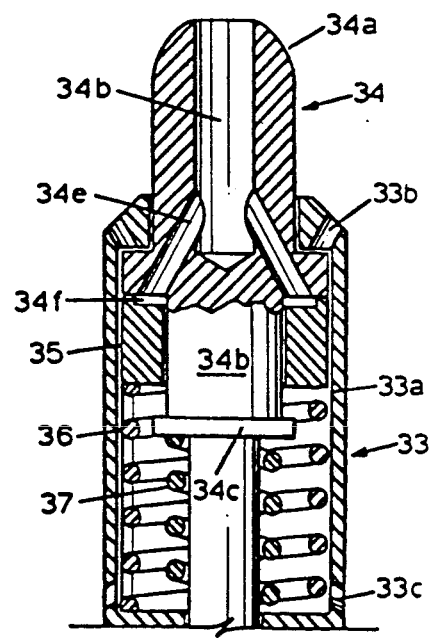
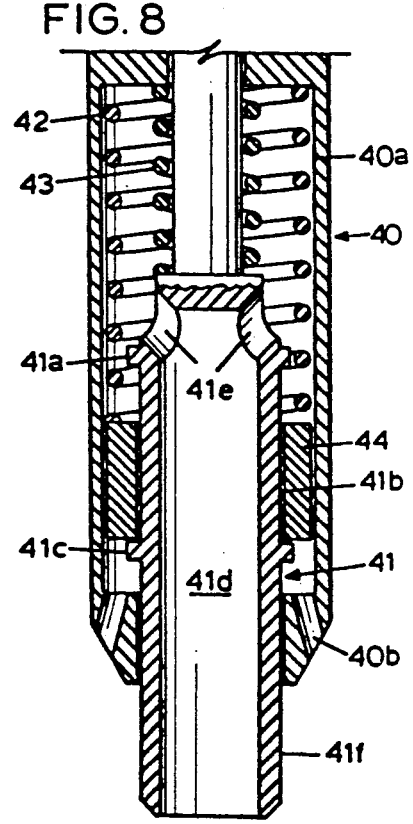

SIGNAL PRESSURE PULSE GENERATOR

This is a division of U.S. patent application Ser. No. 07/506,453 filed Apr. 9, 1990; which was a continuation of U.S. patent application Ser. No. 07/330,791 filed Mar. 30, 1989, now abandoned; which was a divisional of U.S. patent application Ser. No. 07/865,083 filed May 19, 1986, now U.S. Pat. No. 4,825,421.

FIELD OF UTILIZATION

This invention pertains to the generation of fluid pressure pulses in fluid pumped down drill strings in well drilling practices for borehole telemetry purposes. The practice is referred to generally as "measurement while drilling." More specifically, the invention relates to apparatus for the generation of pressure pulses in response to sensors and control instruments downhole.

RELATED ART

In current use are digital pressure pulse generators taught by the following U.S. Pat. Nos.:

| | |
|---|---|
| (1) 3,065,416 | November, 1962 |
| (2) 3,737,843 | July, 1973 |
| (3) 3,756,076 | September, 1973 |
| (4) 3,958,217 | May, 1976 |
| (5) 3,983,948 | October, 1976 |
| (6) 4,120,097 | October 1978 |
| (7) 4,386,422 | May, 1983 |

BACKGROUND OF THE INVENTION

Rotary well drilling practices include the use of drill strings with drilling fluid pumped down the drill string bore. On long drill strings, communication with the downhole system from the earth surface is difficult, because electric conductors are hard to install and maintain while drilling is in progress.

In recent years, it has become common practice to measure downhole parameters of interest with sensors and convert the resulting information into electric signals, convert the signals to drilling fluid pressure pulses in the drilling fluid in the pipe string bore, and to detect and decode the pressure pulses at the earth surface to recover the information transmitted.

The downhole apparatus that responds to electric signals and generates pressure pulses has been troublesome. Electric power has been used to operate solenoids to operate valves to generate drilling fluid pressure pulses. The generation of electric power has been a problem, and the valve operating gear has been costly and prone to failure.

Apparatus is needed that will cause cyclic pressure changes in the drilling fluid stream, unless action is taken to stop the pulse generating apparatus. Hardware needed to stop a self-excited pulse generator can be much simpler and consume less electric power than hardware required to cause and control pulse generation.

OBJECTS

It is therefore an object of this invention to provide apparatus that is self-exciting and self energizing to generate drilling fluid pressure pulses in drill strings at a downhole location for communication purposes.

It is another object of this invention to provide apparatus to control a self-exciting and self-energizing mechanical oscillator downhole on drill strings to cause, by selective exercising of such controls, the generation of fluid pressure changes of time distributed patterns to transmit encoded information through a drill string bore.

It is yet another object of this invention to provide controlled, self-excited and self-energized fluid pressure pulse generators that can be packaged in shuttle form to be lowered to a downhole location through a drill string bore.

It is still another object of this invention to provide apparatus that will cooperate with the inertia of a fluid stream, and the elasticity of the fluid stream and confining drill string, to accomplish the effect of an oscillator that will generate a standing pressure variation wave form continuously until controlled, as long as fluid is pumped down the drill string.

It is yet a further object of this invention to provide apparatus to force the mechanical oscillator to function on fluid flow surface tests, and when the long drill string with fluid flow inertia and elasticity is not adequate to cooperate in creating the self-exciting cooperation of the mechanical assembly to be eventually used downhole.

It is still another object of this invention to provide apparatus to cooperate with reciprocating action of downhole mechanical oscillators to generate electric energy for the downhole apparatus and to regulate standing wave frequency modulation.

It is yet a further object of this invention to provide apparatus to control a mechanical oscillator such that oscillating motion may be stopped at zero velocity to conserve stored energy in naturally oscillating elements and to reduce shock to controlled and controlling elements.

It is still another object of this invention to provide control means to cause an auto-cycling pulse generating valve to function such that a variety of encoding systems can be used selectively by downhole signal processors.

These and other objects, advantages, and features of this invention will be apparent to those skilled in the art from a consideration of this specification, including the attached drawings and appended claims.

SUMMARY OF THE INVENTION

A downhole self-excited auto-cycling mechanical oscillator is combined with a selective control to respond to downhole parameter sensors and encoder to generate a controlled time distributed sequence of pressure changes in a drilling fluid stream flowing down the bore of a drill string to transmit information along the drill string bore to the earth surface while drilling.

The oscillator preferred embodiment is in effect a flow resistance valve designed to cooperate with the flowing drilling fluid to chatter or oscillate between conditions of more resistance and less resistance to fluid flow to, potentially, create a continuous pressure variance wave form approximating a sine wave.

Encoding can be by digital pulse, change-of-state, and standing wave frequency manipulation. To deliver a digital pulse the flow resistance means is stopped at the low resistance point for any integral number of sine wave cycles. To deliver change-of-state, the flow resistance means having been stopped at either the low or high flow resistance point is released to move to the alternate stopping point. To accomplish frequency manipulation, the auto-cycling flow resistance means is allowed to oscillate with one or more cycles slowed down below the natural cyclic period. There are three frequency control options. A linear electric generator output can be controlled to extract energy on a cycle-by-cycle basis, to alter each cyclic period. An internal oil flow variable damper can be used to influence the time period of each cycle, and the axial position locks can be exercised to positively control the time interval between change-of-state, such that an altered standing wave is generated.

A further alternative is to lock the oscillator moving element in either the most open or most closed position of zero velocity. This permits change-of-state encoding to effectively double the data rate.

Provisions are additionally made, optionally, to use the linear motion of the oscillator to generate electrical energy downhole for use of control instrumentation.

Disclosed also are provisions to install the apparatus in the drill string or to package it as a shuttle assembly to be lowered to the downhole location through the drill string bore.

Encoding practices

Pressure pulse generators are commonly means to change the resistance to the flow of drilling fluid down the drill string bore to produce pressure changes detectable at the earth surface. Early well bore communication practices involved time distributed digital pulses devised to transmit binary code. A digital pulse changes flow resistance briefly and returns to the original state. If the downhole apparatus could deliver, say, one pulse per second, the message could be divided into one second increments. A pulse at a particular interval could represent a zero, and that interval without a pulse could represent a one.

With a number of options available over a selected time period for a message to be encoded, the various combinations possible may contain more message options than the binary code could transmit. Solid state signal processors usable downhole now make combination encoding attractive.

By using flow resistance change apparatus downhole that can retain a selected flow resistance, change-of-state encoding is possible. One state may be wide open, and a second state may have a flow resistance producing in the order of a 100 psi pressure differential over the signal valve. Change-of-state may produce more data bits per second than digital pulses, because a pulse is two changes of state. With change-of-state either binary or combination encoding, or other coding systems may be used.

High speed signal valves that can produce pulses or change-of-state can usually produce standing pressure waves ideally resembling sine waves. If standing wave frequency can readily be controlled, encoding by phase shift and frequency modulation becomes practical.

Phase shift encoding usually requires several cycles to detect at the earth surface. Only limited frequency ranges transmit well in drill strings, and any cycles invested in detecting one data bit will reduce the message delivery rate. The ability to shift phase implies the ability to modulate frequency, and frequency modulation offers advantages.

Apparatus of this invention responds to electrical signals, and any methods for formulating codes in a time distributed manner may be used if compatible with the apparatus. The apparatus will be referred to as a pulser but produces flow resistance changes in a rapid sequence if uninhibited. The ability to inhibit change for any selected period of time, within the signal response time of the apparatus, permits encoding in many formats by digital pulses, change of state, phase shift of standing waves, and frequency modulation of standing waves, or any combination. Since no change is required in the apparatus to change the manner of encoding, for instance, an interval of frequency modulation can be directly preceded by a sequence of digital Pulses and followed by a change-of-state sequence in a single encoded message.

BRIEF DESCRIPTION OF DRAWINGS

In the drawings, wherein like reference characters are used throughout to designate like parts:

FIG. 1 is a side view, partially cutaway, showing a pulser package in the usual relationship with a drill string;

FIG. 2 is a side view, partially cutaway, showing an inverted pulser suspended in a drill string and its relationship to an orifice;

FIG. 3 is a side view, partially cutaway, showing a pulser in a shuttle assembly in a drill string utilizing an inverted pulser;

FIG. 6 is a side view, partially cutaway, showing the operating mechanism for the preferred inverted pulser in accordance with the format of FIG. 2 and FIG. 3;

FIG. 7 is a side view, partially cutaway, showing a modification of the pulser of FIG. 4 to force auto-cycling;

FIG. 8 is a side view, partially cutaway, showing a modification of the pulser of FIG. 6 to force auto-cycling;

DETAILED DESCRIPTION OF DRAWINGS

Figure 4:
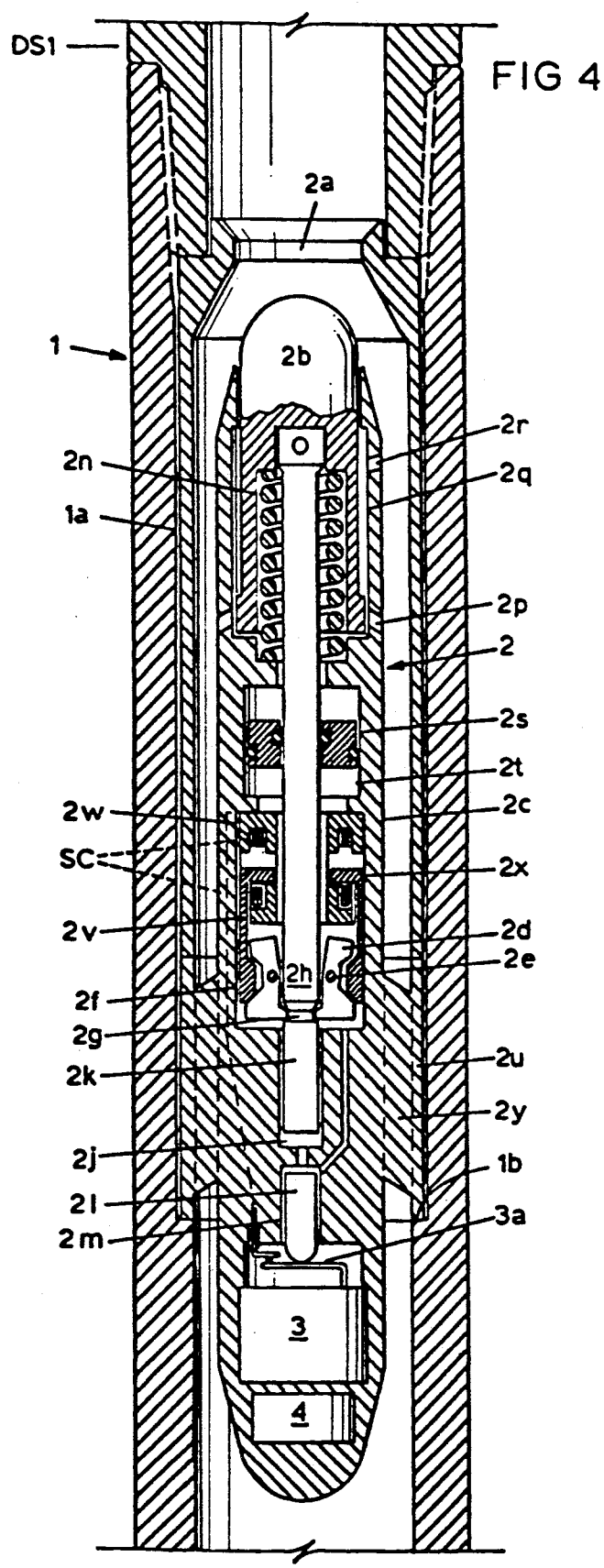
FIG. 4 is a side view, partially cutaway, showing an autocycling pulser valve assembly, with controls, in accordance with the format of FIG. 1.

Many features of construction, assembly, and maintenance utility such as threads are omitted, if not pertinent to points of novelty, to more clearly illustrate functional aspects of the apparatus.

FIGS. 1, 2, and 3 describe the general arrangement of drill strings and the relationship of fluid flow resistance change signal systems to the drill string bore, and drilling fluid streams. Subsequent figures may pertain to the signal generators only, and the overall structure will not, in each case, be redrawn.

In FIG. 1, an upwardly continuing drill string DS1 is threadedly attached at the top to body 1. This is a fluid tight tool joint connection. Body 1 is a drill string element with bore 1a adapted to mount pulser 2 securely to the body, the mounting details to be subsequently shown. An orifice 2a is also mounted in the bore 1a, so positioned that the pulser poppet 2b can move axially to inhibit flow of fluid therethrough.

Body bore 1b is commonly reduced in diameter from bore 1a and leads to tool joint connections for fluid tight attachment to a downwardly continuing drill string DS2.

Fluid is pumped down the drill string bore from the earth surface and flows through orifice 2a, around pulser 2, into bore 1b, and into the downwardly continuing drill string DS2.

Though not a point of novelty in this invention, but of necessity usually mounted with the pulser, sensor package 4 and signal processor package 3 are part of the overall bore suspended assembly. The sensors detect parameters of interest downhole such as pressure, temperature, and earth azimuth relationship to some reference on the downhole assembly and angle off vertical of the drill string centerline. Some sensors may be in the drill string wall and wired to the package shown.

FIG. 2 discloses a mud flow restricting signal valve that is upside down when compared with conventional signal valves. One advantage of this arrangement is the absence of moving valve elements exposed to the turbulence of the valve exit velocity.

The body of FIG. 2 can be exactly like the body of FIG. 1 but inverted, and pulser 5 is supported in bore 1a. The orifice 5a is again secured to the body and cooperates with poppet 5b to restrict fluid flow.

FIG. 3 represents a different body bore configuration in a body associated with a drill string as described for FIG. 1. The pulser 9 is part of a shuttle assembly 10 that can travel down the drill string bore to land on a support 8a. Support 8a is a tube having a bore restriction through which the shuttle body will not pass. Support 8a is connected to the orifice structure with fins which allow mud to flow downward.

Poppet 9b extends downward through the support, called a baffle, and reciprocates axially to accomplish variable flow resistance in cooperation with orifice 8.

The long shuttle commonly contains sensor package 4 and signal processor package 3 and needs some form of radial stabilization. Fins 7b are shown to be part of the body extending radially into body bore 7a to approach the shutter outer surface.

The shuttle assembly is rarely dropped down a drill string bore. It is lowered into the bore by a wire line which engages the overshot spear atop terminal 10a. This handling of shuttle assemblies is commonly practiced.

Baffle 8a can comprise a muleshoe which engages a pin 9a on the shuttle assembly to rotationally orient the shuttle relative to the drill string. The muleshoe and pin arrangement is well established in the art and is not shown in detail.

Flow control valve details to follow are called pulsers, because they are inherently auto-cycling and will oscillate and cause fluid pressure pulses, as long as fluid flows, unless they are inhibited. To best understand these valves, it is best now to describe FIGS. 11A, B, and C.

Figure 11A:
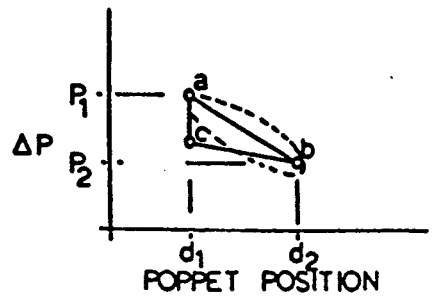
FIGS. 11A, 11B, and 11C are graphic presentations of the physical factors contributing to the ability of reciprocating pulser valves to continually auto-cycle in cooperation with fluid flow.

FIG. 11A applies to the common relief valve used to limit pressure in a common hydraulic fluid body. The abscissa represents dimension traversed by the valve poppet from the cooperating seat. The ordinate represents pressure being controlled by the relief valve. At point a the valve senses excess pressure P1 and moves from closed at dimension d1 to open at d2, while the pressure at the seat orifice is reduced, as intended, to P2. Assuming the excess pressure is transient, the poppet reverses at some point b and approaches the orifice when pressure is reduced. At point c, the valve closes and pressure grows some above P2 as flow loss is reduced.

If the valve has considerable poppet mass, it moves open more slowly from point a, overshoots point b, causing more system pressure loss than bias alone would have permitted, and finally returns to the seat at d1. This travel is noted by dashed lines.

Figure 11B:
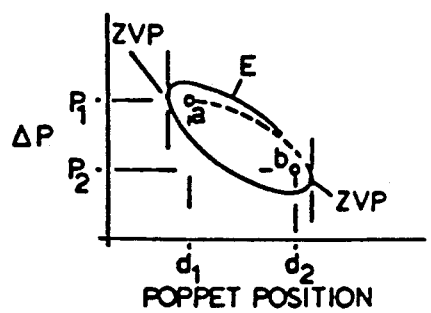

In FIG. 11B, the conventional poppet and seat has been altered, and the poppet can enter the seat bore. The resulting leakage is acceptable and not germane. Excursion of the poppet, made deliberately heavy, will at some time begin at point a, at d1, and move open, overshooting d2, finally reverses direction under bias force, and approaches d1. There is no seat to hit, and the mass of the poppet will overshoot d1, injecting the poppet some distance into the seat orifice. The spring of finite spring rate will have less closing force than it had at point a and d1, and motion reverses and the poppet begins to move toward dimension d1. The single cycle describes the onset of instability. If the upstream system has a constant input, the fluid pressure will increase above P1 while the valve overshoots d1.

Because pressure operating on an area is proportional to force, and because a distance $d_2 - d_1$, plus left and right overshot is distance, the area within the envelope E represents net energy. More energy is delivered to the poppet in opening the valve than in closing the valve, and a net gain in energy results. The amplitude of the poppet excursion, if unchecked, would grow until energy loss in dynamics of motion consumes the net gain in energy for each cycle. The conventional result is water hammer, and a phenomenon known as "chattering" in regulator and relief valves. Apparatus of this invention converts this normally undesirable phenomenon to useful purpose.

It is recognized that the unstable or auto-cycling valve can, under controlled laboratory conditions, be activated under very slowly increasing and very stable flow conditions, such that instability will not occur. Such conditions are rarely realized, even briefly, in practical circumstances—certainly never in drilling activity.

Figure 11C:
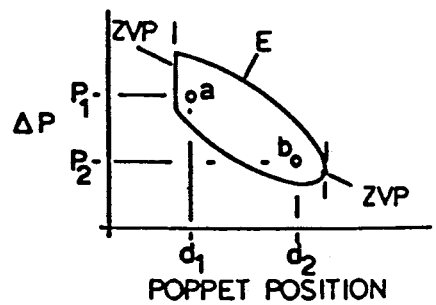

FIG. 11c applies to lost motion provision between a valve and valve operating means responsive to the valve differential pressure and operatively oriented to open the valve on differential pressure increase. Lost motion as will be described later, adds power to envelope E. The vertical line forming the left side of envelope E results from the poppet remaining still and building differential pressure while the pressure responsive element runs out the lost motion. There is very little vertical interval on the right side of envelope, because lost motion run out or recovered while the valve is open has little pressure influence.

For FIGS. 11B and 11C, there are zero velocity points, ZVP, at each left and right extreme of envelope E. At these poppet position points, the poppets are not moving. There is no kinetic energy, and no energy is lost from the poppet if it is locked for any length of time at either of these positions. Once released, the poppet proceeds with the next cycle as if no locking had occurred.

The two points of zero poppet velocity invites the use of the auto-cycling valve for change-of-state encoding. Both ideal locking points can be used. As stated, the poppet can enter the seat orifice and can be made substantially smaller than the orifice to reduce the pressure differential across the valve when locked in the most closed state.

The preferred embodiment of this invention will utilize the auto-cycling valve as a mainstream valve in the drill string to create positive pulses in the mud stream.

To create negative pulses in the mud stream, a valve to 20 control by-pass from the drill string to the well annulus, by-passing fluid above drill bit nozzles and other fluid flow resistances, is a common practice. It is desirable, in such cases, to have a poppet and seal arrangement that is capable of stopping flow through the by-pass as long as the poppet is locked in the most closed position. The envelope E of FIG. 11b can be created by resiliently mounting a seat engaging poppet in a biased mass which moves in general sympathy with the poppet. The poppet will hit the seat at d1, but the resiliently related mass will override the poppet, reverse, and carry the poppet toward open with the kinetic energy of the mass. In such cases, the lock will engage the mass at its zero velocity points. The envelope of FIG. 11c applies for such valve arrangements.

It is well to keep in mind that, in drill strings with a long moving fluid column and powerful surface fluid pumps, the movement of fluid down the drill string is not stopped by main stream signal valves. The signal pulse is small compared with the fluid energy available.

FIG. 4 represents the pulser shown in FIG. 1 and pulser 2, poppet 2b, orifice 2a, sensor package 4, signal conditioner 3, and body 1 retain the original references. The orifice 2a is part of a compression sleeve stack, including housing sleeve 2u, which is held down against shoulder 1b by the tool joint pin of the upwardly continuing drill string. Sleeve and housing are joined by fins 2y.

Poppet 2b is in the most downward position, having been thrust down by a previous cycle and locked down by locks 2d. Lock elements 2d pivot on pins 2e, which are anchored in the housing structure to engage groove 2g in poppet control extension 2h. The locks 2d respond to solenoids 2v and 2w. The solenoids respond to signal processor 3 and move tangs 2f downward to lock, and move tangs 2f upward to unlock. The tangs 2f are attached to armature 2x. Once locked, the lock elements are self retaining because of the force angle between the pins 2e and groove 2g. The solenoids do not have to be actuated until there is a signal to unlock. The solenoid can be oriented by bias means (not shown) to lock automatically on every downstroke of the poppet. The bias means, if needed, is a spring washer inserted between armature 2x and solenoid 2w.

To lock the poppet only when it reaches zero velocity and reverses, switch 3a is in the signal processor-to-solenoid electric line. As poppet control extension 2k moves downward in bore 2j, fluid is expelled to the general enclosure through channels offering some flow resistance, and the resulting slight pressure moves piston 21 in bore 2m to open switch 3a. When the poppet reverses direction, the reverse flow of fluid into the bore 2j allows piston 21 to move upward under switch spring bias, and switch 3a closes. If a voltage has been made available by processor 3, the solenoid 2v will move tangs 2f downward, and the lock elements 2d will hold the poppet down. Switch 3a is a two-pole switch and will remain closed as long as the poppet is locked down. On cue from the processor 3, the solenoid 2w will move tangs 2f upward, unlocking the poppet to create another pulse. Electric lines are not shown in detail.

Poppet 2b is urged upward by spring 2n, and when unlocked will move upward into orifice 2a. The poppet can enter the bore of the orifice. With fluid moving downward through the drill string bore and orifice 2a, a pressure differential will develop across the orifice, and the poppet will be urged back downward. The drilling fluid and confining drill string is never a totally rigid system, and the pressure differential across the orifice increases while flow is impeded for a brief period while the poppet reverses direction.

Fluid flow changes some due to the fluid system resilience, and more fluid energy is applied to move the poppet downward than was available to retard the poppet upward movement. As previously described herein, there is a net gain in energy from the poppet excursion available to overcome friction losses, and the poppet is driven downward. The poppet would be driven downward below the starting point, but downward motion of the poppet forces displaced fluid out ports 2p. Ports 2p are somewhat above the bottom of recess 2q, and when the poppet lower skirt passes the ports, the dashpot effect decelerates the poppet to prevent shock.

Piston 2s in bore 2t is sealed against extension 2h and the bore wall. This is a floating isolator with drilling fluid above piston 2s and oil below. All machinery in the housing 2c below the piston 2s is oil immersed.

The descriptive matter for the apparatus of FIG. 4 pertains to the generation of a digital pulse comprising a full cycle of flow restriction for each actuating signal from processor 3. To use this system for change-of-stage from either the more open or more closed position of the poppet and orifice pair to the other position, a more elaborate locking system is required.

Figure 5:
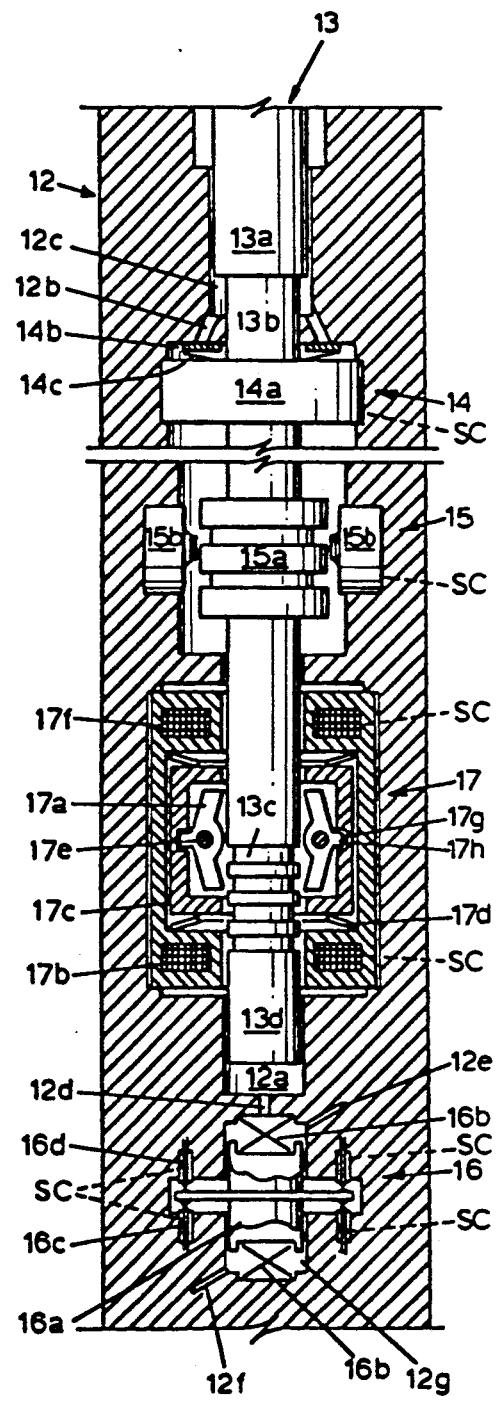
FIG. 5 is a side view, partially cutaway, showing the preferred locking and related machinery for any of the disclosed reciprocating pulsers.

FIG. 5 represents cycle control systems usable with all reciprocating pulser valves presented herein. The outer dimension of housing 12 corresponds to the outer dimension of housing 2c of pulser 2 of FIG. 4. The top of FIG. 5 begins below opening 2t and the lower end terminates just above processor 3 of FIG. 4. For use on pulsers of FIGS. 2 and 3, the apparatus of FIG. 5 is simply turned upside down.

Not shown are oil galleries that allow fluids to flow around machine elements and facilitates removal of air during assembly. Also not shown are wires and wiring chambers that contain wires to switches, solenoids, generator, and processor.

The apparatus of FIG. 5 can control a poppet to encode by digital pulse, by change-of-state, by phase shift and frequency modulation, and can change from one encoding scheme to the other as directed by the signal processor without altering any elements shown.

Poppet extension 13 is attached to a poppet as shown in FIG. 4 and can reciprocate axially. A plurality of lock grooves 13c permit locking at various axial positions, because very low fluid flow rates down the drill string will not produce maximum axial excursion of the poppet. Locking the poppet at zero velocity points perpetuates auto-cycling ability anyway, as previously described herein. The grooves 13c are situated relative to latch rockers 17a such that the poppet can be locked at the most upward zero velocity point or at the most downward zero velocity point.

As shown, assume the poppet extension 13 is moving downward but almost stopped before direction reversal. Fluid has been flowing from bore 12a, through channel 12d, and out channel 2e to the general enclosure, displaced by moving extension end 13d, and a pressure was sensed during downward motion by piston 16a, when fluid flowed to the general enclosure with some flow resistance. Piston 16a was moved down, closing switches 16c to indicate downward motion to the signal processor. Assuming the processor is going to hold the downward position when poppet velocity approaches zero, the opening of switches 16c will cause the processor to signal the solenoid 17 to lock in the downward position. Springs 16b center piston 16a when pressure displacing the piston drops away due to poppet motion ceasing and/or reversing direction. Fluid is vented through channel 12f. As shown, switches 16c have just opened. The processor will fire to energize coil 17b, pulling armature 17c downward, overcoming centering spring washer 17d and, by way of notch 17q and rocker arm 17h, will tilt latch rockers 17a into any groove 13c in registry. As soon as the poppet bias spring (not shown) urges extension 13 upward, the triangular force system imposed between the groove 13c, rocker 17a, and pin 17e will hold the rocker and groove engaged, and energy to coil 17b can be dropped. The spring 17d is not strong enough to unlock the rockers.

When the signal processor again demands upward movement of the poppet extension to change state, energy is applied directly to coil 17f, the switches are not involved. Armature 17c moves upward, rocking latches 17 out of grooves 13c, and extension 13 begins the upward excursion.

The coil 17f may be left energized during the upward excursion of extension 13. The upper ends of rockers 17a will drag on the extension and grooves 13c harmlessly until downward movement of the extension causes self holding of the rockers as previously described. The processor, however, will sense upward movement of the extension because of inflow of oil into bore 12a and consequent upward movement of piston 16a. Switches 16d, by closing, will indicate to the processor that upward motion is taking place. Once upward motion is sensed, voltage to coil 17f could be dropped until opening of switches 16d signals to the processor that upward velocity is approaching zero. If the upward position is to be held as dictated by code sequencing, coil 17f would again be energized, locking the upward position until time to release again is demanded to satisfy encoding.

Pole rings 15a attached to extension 13, and coils 15b attached to housing 12 comprise a linear motion electric generator 15. The drawing is more symbolic than specific, because there have been for many years several designs of such generators available. The moving parts are commonly permanent magnets or flux gates for permanent magnetic fields. The coils are commonly stationary to avoid brushes. Electric energy produced is conveyed by leads to the processor for battery charging under processor control.

Circuitry in the art can be used in processor 3 to control the electric energy from generator 15. This is a convenient way to modify the natural frequency of the auto-cycling fluid flow resistance valve driving extension 13 in reciprocation. This permits generator 15 and processor 3 to carry out limited frequency changes on a cycle-by-cycle basis, which is ideal for phase shift or frequency modulation encoding.

Solenoid 14a and valve armature 14b comprise the essence of a frequency control 14. On extension 13, region 13a and 13b have different diameters and function as an annular piston in bore 12c. During downward movement of extension 13, fluid is displaced from bore 12c through channels 12b into the general enclosure. Armature valve ring 14b is lightly spring loaded upward by spring washer 14c. When extension 13 begins upward motion, the ring 14b will cover channels 12b and slightly resist upward motion of the extension, as long as region 13a is in bore 12c. If a signal from the processor goes to solenoid 14a, armature valve ring 14b will be pulled down to open ports 12b, and the upward excursion of extension 13b will take place at system capability. This enables the processor to leave lock system 17 inactive and transmit a series of fluid pressure pulses in the mud stream at normal system frequency, then to shift phase by retarding one or more cycles of a series.

By selectively exercising the features of FIG. 5 as described herein, a signal processor can control an auto-cycling mud stream valve to signal by phase shift, by frequency modulation, time spaced digital pulses and by time spaced change-of-state. Additionally, the unlocked pulser, capable of autocycling, can run free to charge batteries until energy available enables the signal processor to take control of the mud pressure signal generator.

FIG. 6 illustrates a drilling fluid flow pulser valve functionally similar to that of FIG. 4 and shown related to a drill string in FIG. 2. The poppet is above or upstream of the cooperating orifice in the manner of a check valve. The poppet has piston surfaces that respond to increasing pressure differential produced by the valve (poppet and orifice pair) to urge the valve to open. By turning the valve upside down the usual silting problem of apparatus used in drilling mud is avoided. Silt is comprised of higher density mud solids settling into quiescent areas of machinery. With the valve upside down, silt falls out. Additionally, drilling fluids coming out of partially closed valves usually find some surface to abrade away. With the arrangement of FIG. 6, only the essential surfaces are below the orifice, and maximum opportunity for velocity diffusion is afforded.

Control lock system 17 has been explained for FIG. 5 and is mounted in housing 20a upside down. Lock system 17 controls the axial movement of poppet extension 21d by engaging any of lock grooves 21h, as was explained for grooves 13c of FIG. 5.

Poppet 21a moves axially, is at an upward position, and being urged downward by spring 21j. Spring and poppet are guided by bore 20e. Spring 21j bears on shoulder 20f and on top of the poppet. Fluid pressure is conducted through bore 21b and channels 21c into bore 20e. The top of the poppet is larger than the lower end and is exposed to the pressure available to bore 20b. Annular piston area 21e is exposed to pressure of fluid conducted through ports 20g, which open above the orifice. When lock 17 releases grooves 21h on signal from the signal processor (not shown), poppet extension 21d and poppet 21a move downward to approach orifice 22. The poppet may enter orifice 22 at low drilling fluid flow rates, but may stop short of entry at high flow rates. As pressure differential develops across the obstructed orifice, bore 21b is exposed to lower downstream pressure, and port 20g is exposed to higher upstream pressure.

The annular area 21e experiences the pressure differential, higher below and lower above. A net lift results at some preselected pressure differential across orifice 22, and the poppet stops downward motion; and if not locked in that position by lock 17, will begin an upstroke. As previously explained herein, the poppet, if uninhibited, will auto-cycle between up and down positions.

There is no fundamental difference between the poppet and orifice pair of FIG. 6 and that of FIG. 4 relative to autocycling, and that feature has been described herein.

Housing 20a is supported by fins 20d extending to compression sleeve 20c. Sleeve 20c is part of a compression stack secured in bore 1a by downward load against shoulder 1b as described for FIG. 4.

Isolator piston 20k is sealed to bore 20b, and extension 1d can move axially and separates mud below from oil above. Pressure is about the same on both sides of piston 20k.

All features of FIG. 5 can optionally be associated with extension 21d as previously described herein.

The structure of FIG. 6, made free of fins 20d, can obviously be part of the shuttle package of FIG. 3. Inside the enclosure of the shuttle the machinery is merely of smaller scale compared with the systems installed in the drill string structure. To serve as part of a shuttle package, the housing 20a will be shaped at the lower end, below ports 20g to fit and be supported by the bore of baffle 8a of FIG. 3.

Referring briefly to FIG. 3, the principal adaptation required of shuttle pulser packages is one of fitting the shuttle lower end to a particular drill string. The variations required pertain to drilling fluid flow rate accommodations. Low flow rates may be 125 gallons per minute, and high flow rates may exceed 1,200 gallons per minute. Large flow rates are usually pumped through drill strings with large bore dimensions, but there are usually various bore restrictions which are not correspondingly large. The shuttle must be small enough to pass through the smallest bore restriction. The poppet that the shuttle can carry is too small to cooperate with an orifice large enough to accommodate the greatest flow rates.

For low flow rates, there is advantage in putting the cooperating orifice in the shuttle body to allow that expendable part to be recovered by wire line along with the shuttle. The arrangement of FIG. 3 is typical of a shuttle for mid range flow rates. With mid range flow rates, the shuttle poppet may be about one and three-fourths inches in diameter cooperating with an orifice of two inch diameter to accept a flow rate of 400 gpm. This size ratio, at that flow, will still yield enough pressure change to represent a detectable pulse or change of state.

FIGS. 7 and 8 disclose means to delay the response of the fluid flow resistance valves actuating means to the differential pressure produced by the valve. The poppet is biased toward valve closure and normally responds to the resulting differential pressure and moves toward the more open state at preselected pressure differentials. As previously explained herein, fluid inertia and upstream resilience in the fluid system provide delay in fluid pressure development, after valved flow resistance increases. To add power to the auto-cycling valve, the features disclosed in FIGS. 7 and 8 add delay to valve elements as well.

Various options disclosed herein, such as generator and frequency modulation controls, extract power from the poppet. The added feature can be defined as a lost motion contrivance in that the piston that responds to valve differential pressure can move some distance before forcing the valve poppet to move toward a lower flow resistance state. This introduces a forced response error, which the valve must move constantly to correct. The result is forced auto-cycling of the valve having the ability to produce additional power in the auto-cycling process.

In FIG. 7, poppet 34 would replace poppet 2b of FIG. 4. Housing 33 may be identical to housing 2c, bore 33a may be identical to bore 2q; all of FIG. 1. All machine elements of FIG. 7 can fit into the unmodified enclosure of FIG. 4, and poppet controls of FIG. 4 or FIG. 5 may be used directly with the continuance of FIG. 7.

When poppet extension 34a approaches a cooperating orifice, the flow being downward, upstream pressure enters opening 34b, is conducted through channels 34e, and exits in region 34f between poppet 34 and free piston 35. The effective piston area exposed to pressure in region 34f exceeds the effective piston area of extension 34a, and the poppet is urged upward into the cooperating orifice.

Fluid pressure downstream of the cooperating orifice enters ports 33b and 33c to exist in chamber 33a. Piston 35 is urged downward by the greater pressure in region 34f, overcoming upward bias of spring 36. The poppet is biased upward by spring 37 to oppose impulse loading on the poppet by fluid flowing downward around the poppet extension. Until piston 35 hits abutting shoulder 34c, the poppet does not begin downward motion and allows a build-up of differential pressure across the cooperating orifice. When the piston 35 hits shoulder 34c, the pressure in region 34f no longer influences either piston or poppet, and the poppet begins downward motion accelerated by the fluid pressure differential and the inertia.

Once the pressure differential is reduced, piston 35 reverses direction and moves relative to the poppet until it engages the poppet at region 34f. Both piston and poppet move upward to repeat the cycle.

The arrangement of locks and such as those of FIG. 5 control the poppet and overall behavior is otherwise the same as described for FIGS. 4 and 5. Use of the arrangement of FIG. 7 only slightly changes the shape of a standing pressure wave form and is not found detrimental to the signal function.

The elements of FIG. 8 fit directly into enclosure 20 of FIG. 6, and all description of functions for FIG. 6 apply concerning locks and the cooperating orifice. As shown in FIG. 8, the poppet 41 is approaching the lower limit of travel on the downstroke. Pressure downstream of the cooperating orifice is conducted through bore 41d and channels 41e into bore 40a.

The annular piston 44 is free to slide on poppet midsection 41b between abutting shoulders 41c and 41a.

Compression spring 42 bears on the piston and spring 43 bears on the poppet.

When orifice differential pressure develops, the upstream pressure is conducted through ports 40b to act on the lower face of pistons 44. The poppet is not influenced by differential pressure, because most effective piston surfaces on the poppet are exposed to the same pressure.

Piston 44 does not need sliding seals, because some leakage past the inner and outer cylindrical surfaces of the piston is preferred. The leakage due to radial clearances is small compared with available flow, and the piston moves freely upward under the influence of differential pressure, compressing bias spring 42.

When piston 44 is moving upward between travel limits on the poppet, the poppet may continue downward motion, increasing pressure across a cooperating orifice.

When piston 44 engages abutting shoulder 41a, its upward motion accelerates the poppet upward and continues to apply upward motion to the poppet, as long as the differential pressure lasts.

After the poppet is lifted clear of the cooperating orifice, differential pressure is dropped away, and bore 41d and ports 40b are exposed to upstream pressure. Piston 44 loses lifting ability, but the upward velocity carries piston and poppet some additional upward distance.

At some upward position, all kinetic energy of the moving mass of poppet and piston is converted to potential energy in the compressed springs. Spring 43 is optional but provides more uniform auto-cycling performance over wide fluid flow ranges.

If the lock system described herein engages the poppet at the most upward position, no kinetic energy is lost from holding that position any length of time.

From the most upward position, downward motion begins. The bias to mass ratio of piston 44 is greater than that for the poppet and its bias, and the piston moves down relative to the poppet to engage shoulder 41c, whether the poppet is locked in the upper position or not; and the cycle repeats endlessly unless locks are engaged on the poppet extension rod.

The free piston system forces auto-cycling, even if upstream fluid inertia and resilience are too low to otherwise auto-cycle. Additionally, the free piston system, as explained for FIG. 7, adds power to the poppet excursion to drive electric generator and frequency modulation features. The free piston somewhat alters the profile of the differential pressure wave related to the poppet and orifice pair, forming a variable flow resistance valve. The altered wave shape is not detrimental to the communication function.

Figure 9:
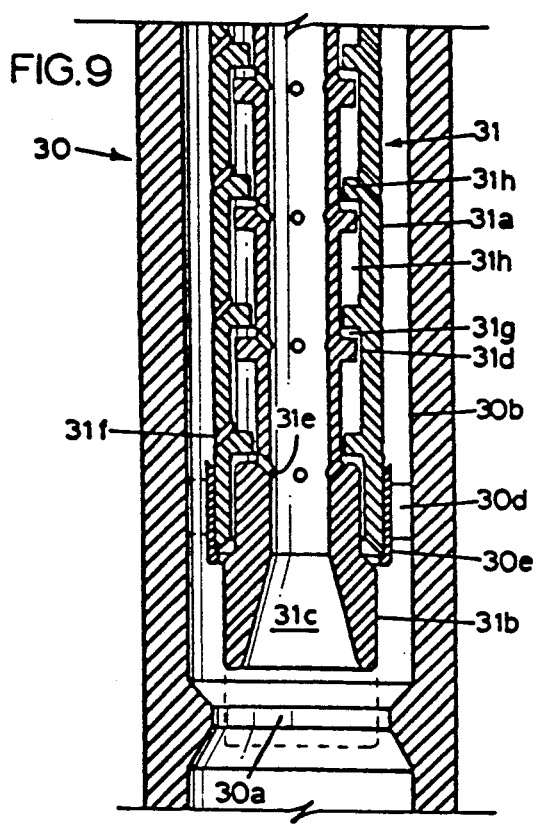
FIG. 9 is a side view, partially cutaway, showing a modification of the pulser of FIG. 6 to extend the flow range of the pulser of FIG. 6 when used in the shuttle format of FIG. 3.

FIG. 9 represents only the lower end of a shuttle and the cooperating orifice. This represents the extreme of poppet diameter and adaptations to allow the apparatus of FIG. 6 to function in a small diameter shuttle, when high flow rates are used.

Body 30 is a part of the drill string according to previous descriptions, with orifice 30a in bore 30b, through which drilling fluid flows. Shuttle 31 is supported in bore 30b by cup baffle 30e, which is attached to body 30 by fins 30d.

Poppet 31b has bore 31c, which conducts fluid through ports 31e to annular cylinders 31g. Fluid above the orifice 30a in bore 30b is admitted through ports 31f to annular cylinders 31h. The plurality of annular cylinders, in tandem, provide enough lift when poppet 31b approaches orifice 30a to start the poppet upward motion. The upper portion of the poppet, extension, and related machinery corresponds to the apparatus of FIG. 6. The plurality of annular cylinders and piston areas do the same thing as annular piston 21e of FIG. 6 without shrinking the poppet bore to such small size, in the slender shuttle, as to reduce cyclic rate by fluid flow restriction.

Figure 10:
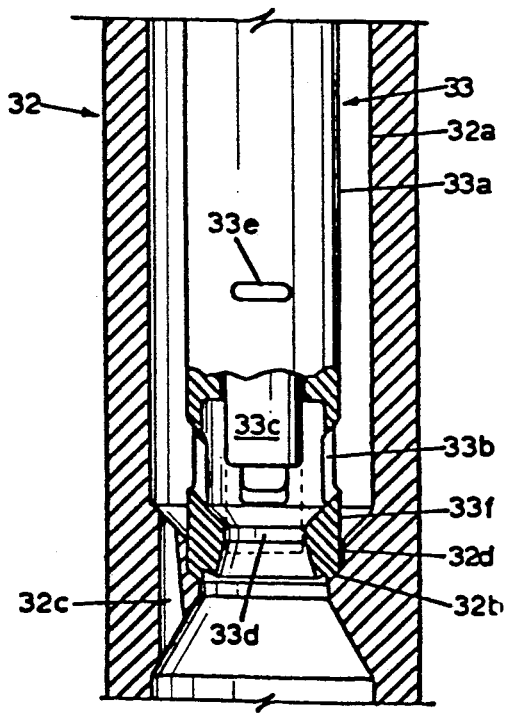
FIG. 10 is a side view, partially cutaway, showing the lower end of the pulser of FIG. 6 for use in the shuttle format of FIG. 3 adapted to low fluid flow applications.

FIG. 10 shows only the lower end of a shuttle housing 33a supported in body 32 on a receiving restriction 32b of bore 32a. Orifice 33d is part of the shuttle. Fluid flows down bore 32a, through ports 33b, and through the orifice 33d. If the drilling fluid flow is too high to be carried through orifice 33d, optional by-pass ports 32c are provided through bore restriction 32b. Poppet 33c and ports 33e correspond to poppet 20h, and ports 20g of FIG. 6 and all other descriptive matter pertaining to function is identical. Body 32 is part of the drill string when assembled.

Guide bore 32d may provide a conventional muleshoe surface. With the muleshoe, if used, a cooperating pin will be used on the outer surface of the shuttle in accordance with current practice.

Figure 12:
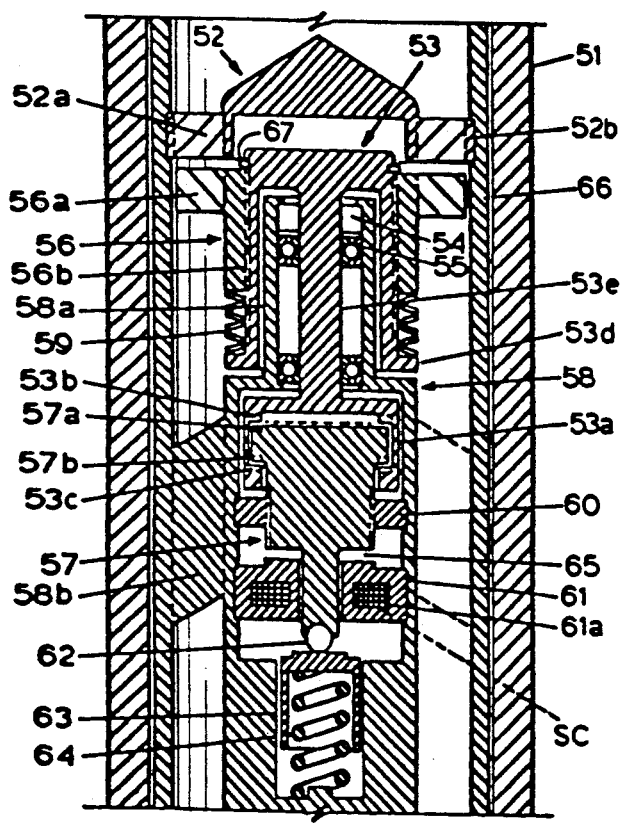
FIG. 12 is a side view, in cutaway, showing features of a turbine powered rotary pulser valve and controls.

The apparatus of FIG. 12 is a rotary pulser valve that will continually auto-cycle to produce a standing pressure wave unless inhibited. Body 51 is part of a drill string as previously described herein. Housing 58 is mounted in the body bore by fins 58b, which connect to compression sleeve stack 66. The compression sleeve stack security has been explained relative to FIG. 4. Stator 52 has radially extending turbine blades 52a shrouded by ring 52b which, in turn, is secured within the compression sleeve stack 66.

Arbor 53 is mounted for rotation on bearings 55 in housing 58. The housing enclosure is sealed by seal 54, which closes the opening between arbor shaft 53e and the bore of housing extension 58a.

Rotor 56 is a sleeve with a bore having internal splines 56b which is slidably situated on arbor skirt 53d, which has mating external axial splines and a lower radial flange. The rotor has radial turbine blades 56a which extend to approach the inner bore of sleeve 66. The rotor is biased upward by springs 59 which rest on the arbor radial flange, and is limited in upward travel by snap ring 67.

Arbor 53 has, at the lower end escapement tub 53a, which has sprocket teeth 53b on the upper inside and sprocket teeth 53c on the lower inside.

Escapement pawl carrier 57 is mounted for limited axial motion and secured against rotation by spline ring 60. Spline ring 60 is secured within the housing and has internal spline teeth slidably mated to external spline teeth on carrier 57. Carrier 57 is biased upward by spring carrier 63 which, in turn, is biased upward by spring 64, which rests on the housing. Upward force is transmitted to carrier 57 by ball 62.

When biased upward, carrier 57 leaves a flux gap 65 between the lower face of carrier 57 and solenoid 61.

Solenoid 61 is secured in the housing and has coils 61a powered by any suitable downhole instrument compatible. The wire leads are not shown. When the coil 61a is energized, it pulls carrier 57 downward, overcoming bias 64.

By processes to be shown later, when carrier 57 is in the upward position, pawls 57a engage sprocket teeth 53b and lock the arbor and rotor in one position. When the solenoid pulls carrier 57 downward, pawls and sprockets 57b and 53c are brought into interference before pawls and sprockets 57a and 53c are freed of engagement. The single downward stroke of carrier 57 allows arbor 53 and rotor 56 to turn one-half increment. When the solenoid releases carrier 57, it is again biased upward, and pawls and sprockets 57a and sprockets 53b are placed in interference before pawls and sprockets 57b and 53c are freed of engagement. The described escapement cycle—downstroke and upstroke—has allowed the arbor and rotor to turn one increment.

The preferred embodiment has twenty-four stator blades, twenty-four rotor blades, twenty-four teeth on each sprocket, and twenty-four teeth on pawl carrier 57 facing each sprocket. One increment of rotor rotation is fifteen degrees.

As will be shown later, when carrier 57 is biased upward, the rotor blades are in streamline registry below the stator blades. When carrier 57 is pulled downward, the rotor can advance one-half increment and the rotor is in streamline interference with the stator blades. Fluid flows downward between stator blades and rotor blades, and when the blades are stopped in streamline interference, the pressure drop across the rotor increases The rotor is biased upward and will move downward until the pressure drop is reduced to a preselected level. The rotor and stator blades are shaped to be inefficient when in the streamline interference situation, but the output torque on the rotor is diminished very little by the forced separation from the stator.

The rotor blades provide torque to drive the arbor in rotation. If the solenoid is provided a pulsed current such that carrier 57 reciprocates up and down, the turbine will create in the flowing fluid stream a sympathetic pressure wave in synchronization with the applied solenoid current. If there is no solenoid current, carrier 57 stays in the upward position, and pressure drop through the turbine is minimized. Similarly, if current is constantly applied to the solenoid and carrier 57 is held down, the higher pressure drop through the turbine is held at the preset maximum.

The system described, then, can create communication pressure change for encoding by discrete pulse generation, by time distributed change-of-state, by phase shift, and by frequency modulation, or any combination in accordance with the instrument or signal conditioner providing energy to the solenoid.

Figure 13A:
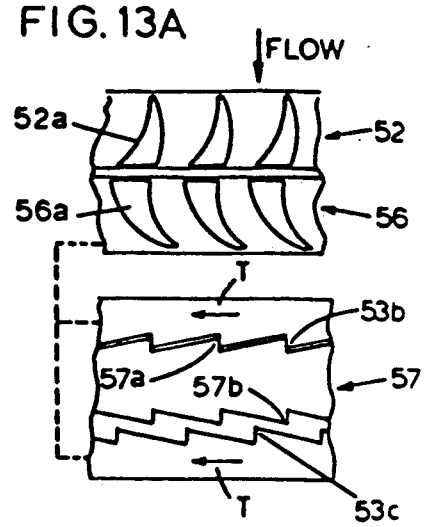
FIG. 13A and 13B are imaginary surface developments of the apparatus of FIG. 12, showing the relationship of controls and controlled elements.

FIGS. 13A and B more fully describe the turbine rotor and stator relationship and the relationship between the escapement mechanism and the rotor. Consider both views as developments of an imaginary cylindrical surface-cutting sprockets 53b and 53c and pawls 57a and 57b, and a larger cylindrical surface cutting through turbine blades 52a and 56a. Keep in mind that rotor 56 is rotationally attached to the sprockets 53b and 53c. Torque is applied by the rotor in the direction of arrows T.

In FIG. 13A, the pawl carrier is in the normal biased upward position. The pawl carrier is secured against rotation. Pawls 57a engage sprockets 53b. The rotational relationships are such that in any such upward engagement, the rotor turbine blades are stopped in the most streamlined registry with the stator turbine blades.

Sprockets 53b and 53c are one-half increment out of registry. Dimensions are such that the pawls can move downward to free the upper sprockets, but the lower pawls 57b are in position to engage sprockets 53c before the sprockets 53b are free to move left, allowing rotation.

Figure 13B:
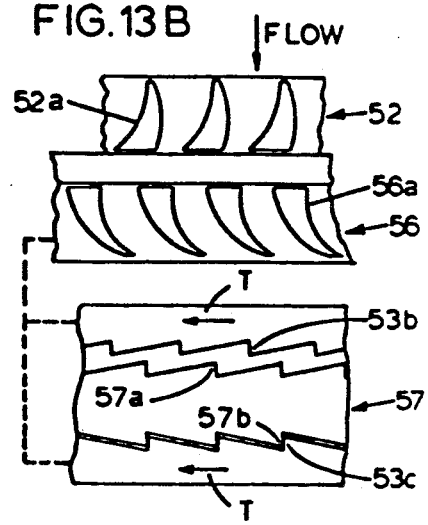

In FIG. 13B, pawls 57a have released sprockets 53b, all sprockets have moved one-half increment left, and sprockets 53c have engaged pawls 57b to stop motion. The rotor has been allowed to move one-half increment, and the rotor blades are in streamline interference with the stator blades. This greatly increases the pressure drop across the turbine rotor, and the rotor has moved down as permitted by preselected bias. It is a peculiarity of turbines that torque produced by the rotor is determined by the total change in peripheral component of fluid velocity coursing through the rotor, and the interference and change in rotor-stator spacing will not greatly change the rotor torque.

Figure 14:
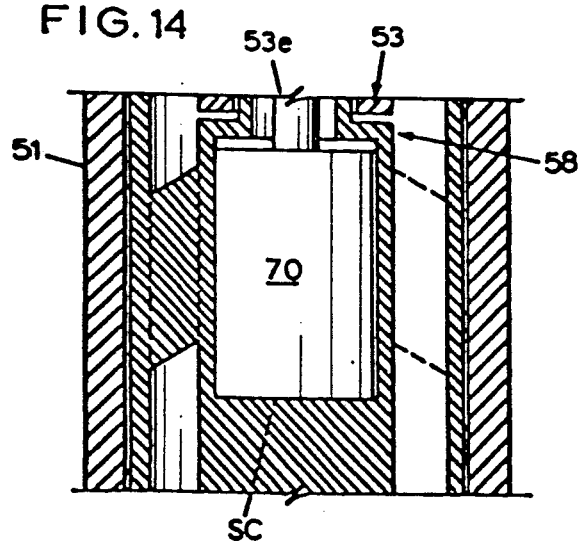
FIG. 14 is a side view, partially cutaway, showing a modification of the apparatus of FIG. 12 for frequency modulation of standing wave fluid pressure signals.

FIG. 14 shows only part of the general apparatus of FIG. 12 fitted with an electric generator 70 in housing 58, attached to and driven by arbor shaft 53e. The housing does not require change. Sprocket tub 53a, splined ring 60, solenoid 61, and pawl carrier 57 is removed. Bias elements 63 and 64 are not needed. Wire leads (not shown) formerly connecting solenoid coil 61a to the signal conditioner, now connect the generator (a permanent magnet alternator) to the signal conditioner.

The arrangement of FIG. 14 is suitable for frequency modulation of the drilling fluid pressure variance standing wave form. The alternator produces an alternating current synchronized with the frequency of the fluid pressure wave generated by the turbine. The turbine speed is inversely proportional to load, and the signal conditioner can control the load. The signal conditioner determines turbine produced fluid pressure pulse frequency and adjusts alternator output load to correct any error and to provide the instantaneous fluid pulse frequency dictated by the encoded message being transmitted.

Alternator load demanded and distributed by the signal conditioner includes battery charging, system power supply, and waste loading.

Figure 15:
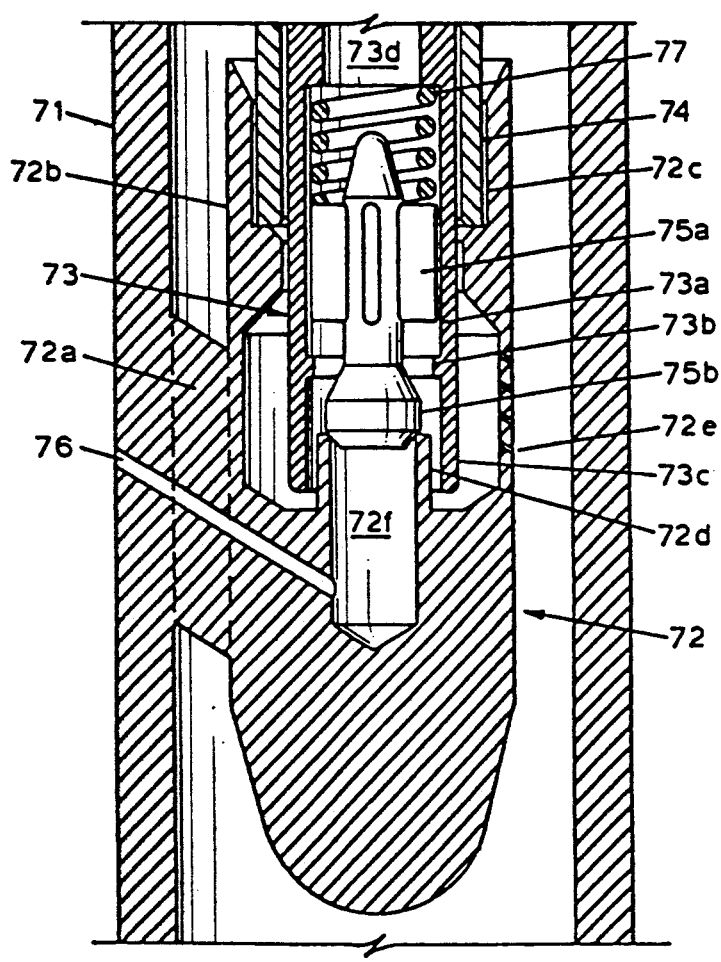
FIGS. 15A and B are side views, partially cutaway, showing the manner of use of the pulser of FIG. 6, modified, in the Pulser format of FIG. 3 to create negative pressure pulses or flow resistance changes for communication.
Figure 15:
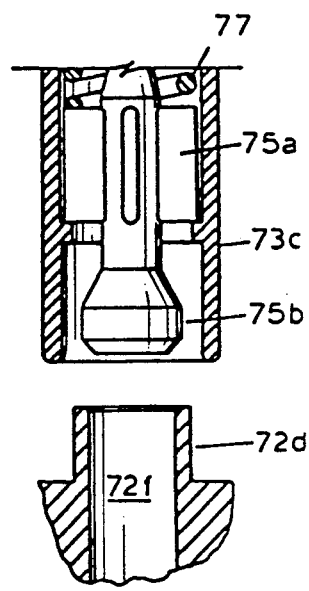

FIG. 15A discloses the use of the pulser of FIG. 6 for the generation of negative pulses or change of resistance to the flow of drilling fluid by manipulation of by-pass flow. The pulser of FIG. 6 requires modification of the poppet terminal. If used in the shuttle concept in accordance with FIG. 3, the pulser housing must be compatible with the system used to support the shuttle assembly package in the drill string bore.

In FIG. 15a, body 71 is the usual drill string segment. Diverter 72 is suspended in the body bore by three fins 72a. At least one fin has channel 76 extending from bore 72f to conduct available fluid flow to the well bore by-passing flow resistances below such as drill bit jets. The diverter has upwardly opening cup baffle 72b with receiving bore 72c to accept shuttle housing nose 74, when the shuttle is lowered through the drill string bore.

Poppet 73 has bore 73a to guide and confine plug fins 75a. The fins 75a can move axially, thrust down by spring 77, which exerts upward thrust on poppet 73 The fins can move downward limited by bore reduction 73b.

Plug head 75b engages the top of tubular extension 72d to stop flow of fluid into bore 72f.

When the poppet is unlocked from the extreme downward position shown, by processes previously described herein, spring 77 thrusts the poppet upward, because spring 77 is substantially stronger in the extreme downward position of the poppet than the spring (21j of FIG. 6) urging the poppet downward. Inertia of the poppet lifts plug head 75b, when bore reduction 73b engages fins 75a. When plug head 75b lifts from extension 72d, the low pressure outside the drill string is exposed to the poppet bore and is conducted upward through bore 73d to the poppet operating mechanism, and the poppet is accelerated upward as previously described relative to FIG. 6.

Fluid flows through screens 72e from the drill string bore into the bore of extension of 73c and into bore 72f and out channel 76, and a pressure reduction is realized in the drill string bore. The poppet inertia carries the poppet to the position shown in FIG. 15B. This is one change-of-state or one-half pulse. The poppet may be locked in this position for later release or may return downward under poppet spring bias, because in the upper position of FIG. 15B, the pressure in the poppet bore is quite close to that in the drill string.

On the downstroke, plug 75b engages the extension 72d and shuts off flow through bore 72f. Poppet inertia carries the poppet on downward to the position shown in FIG. 15A. This invests energy in spring 77, and if not locked downward, the cycle will repeat.

Energy to continually power the cycle is explained for FIG. 11B and 11C.

The receiving cup 72b may be separated from the diverter structure 72. The advantage of placing the receiving cup some distance upward as a shuttle landing baffle has to do with the ability to dump debris that may collect from the drilling fluid when the shuttle assembly is lifted from the drill string.

A muleshoe may be included in receiving cup 72b. The use of muleshoes to orient shuttles is well established in the art and is not shown.

From the foregoing, it will be seen that this invention is one well adapted to attain all of the ends and objects hereinabove set forth, together will other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, I claim:

1. Apparatus for use in a pipe string having a bore suspended in a well with a drilling fluid stream flowing in said bore, said apparatus generating time distributed fluid pressure change signals in said fluid stream in response to signals from a downhole instrument for detection at the surface of said well, the apparatus comprising:
   (a) a housing with means at each end to attach to a continuing portion of said pipe string, said housing including fluid channel means therein to conduct at least a portion of said fluid stream between an upwardly continuing portion of said pipe string and a downwardly continuing portion of said pipe string;
   (b) a stator fixedly mounted to and within said housing, said stator having a plurality of stator blades projecting radially therefrom;
   (c) an arbor rotationally mounted within said housing adjacent to said stator, said arbor having a rotor mounted thereon, said rotor having plurality of rotor blades projecting radially therefrom, said stator blades and said rotor blades cooperating to provide a rotational torque to said arbor when said fluid stream is conducted through said housing;
   (d) arbor, said control means being responsive to said signals from said a downhold instrument to control the amount of time said stator blades and said rotor blades are in streamline registry and streamline interference with one another, thereby generating said time distributed fluid pressure change signals in said fluid stream.

2. The apparatus of claim 1 further comprising means for limiting the amount of pressure drop across said stator blades and said rotor blades.

3. The apparatus of claim 1 wherein said rotational control means comprises an escapement tub secured to the lower end of said arbor, an axially moveable escapement pawl carrier mounted within said escapement tub, and means for moving said escapement pawl carrier axially within said escapement tub.

4. Apparatus for use in a pipe string having a bore suspended in a well and conducting a fluid stream along said pipe bore, said apparatus producing a time distributed series of fluid pressure change signals in said fluid stream in response to signals from a downhole instrument for detection at the surface, the apparatus comprising:
   (a) a housing with means at one end for fluid tight connection to an upwardly continuing portion of said pipe string and means at the other end for fluid tight connected to a downwardly continuing portion of said pipe string, and fluid channel means therein to conduct said fluid stream between said portions of said pipe string;
   (b) a fluid powered turbine in said housing arranged to receive at least part of said fluid stream to produce a rotational effort output;
   (c) a rotary valve means rotationally connected to said turbine with at least one fluid channel arranged to pass at least part of said fluid stream and to variably resist the flow of said part of said fluid stream to cause at least one cycle of fluid change pressure in said stream, said cycle to proceed from a preselected maximum fluid pressure to a preselected lower minimum fluid pressure and back to said maximum fluid pressure, for each incremental turn of said valve relative to said housing;
   (d) rotational control means in said housing operably associated with said rotary valve means responsive to said signals from said downhole instrument to momentarily stop the rotation of said rotary valve means in selected rotary positions relative to positions corresponding to said preselected maximum fluid pressure, said lower minimum fluid pressure thereby generating said series of fluid pressure signals in said fluid stream.

5. Apparatus for use in a pipe string having a bore suspended in a well and conducting a fluid stream along said pipe bore, said apparatus producing time distributed fluid pressure change signals in the fluid stream in response to signals from a downhole instrument for detection at the surface, the apparatus comprising:
   (a) a housing having means at one end for fluid tight attachment to an upwardly continuing portion of the pipe string and means at the outer end for fluid tight attachment to a downwardly continuing portion of the pipe string and having fluid channel means for conducting said fluid stream between said portions;

a fluid powered turbine in said housing and comprising a rotor and a fixed stator, said rotor supported for rotation relative to said stator within said housing, said rotor and stator each having a plurality of blades projecting radially therefrom defining a plurality of peripherally distributed fluid channels therebetween, said fluid channels being shaped to add peripheral velocity to said fluid flowing therethrough to provide impulse loading to drive said rotor in said rotation, said stator and said rotor channels being arranged such that in a preselected amount of rotation of said rotor with respect to said stator, said rotor and said stator channels are in streamlined registry, then move through a position of maximum interference with the flow of fluid moving through said turbine, and again are in said streamlined registry thereby producing rotary position dependent variable resistance to fluid flow through said turbine;

(d) load means connected to said rotor to change the rotational speed of said rotor in response to signals from said downhole instrument to generate said time distributed fluid pressure change signals in said fluid stream that result from different rotational positions of said rotor relative to said stator.

6. The apparatus of claim 5 wherein said rotor of said turbine is axially movable in the direction of said fluid stream moving therethrough to vary the distance between said rotor and said stator, said apparatus further comprising bias means arranged to urge said rotor toward said stator to limit the amount of pressure drop through said turbine when said rotor and said stator channels are in said position of maximum interference.

7. The apparatus of claim 5 wherein said load means is arranged to control the time required for said rotor to move relative to said stator to equal an amount determined by said signals from said downhole instrument.

8. The apparatus of claim 5 wherein said fluid powered turbine comprises a plurality of stages, each stage comprising a rotor and stator.

9. The apparatus of claim 5 wherein said load means comprises an electric energy generating device to produce electric power by said rotation of said valve.

10. The apparatus of claim 5 wherein said load means comprises locking means for releasably locking said rotor in various rotational positions relative to said stator.

11. Apparatus for use in a pipe string having a bore and suspended in a well and conducting a fluid stream along said pipe bore, said apparatus producing time distributed fluid pressure change signals in said fluid stream characteristic of an encoded message from a downhole instrument for detection at the surface, the apparatus comprising:

(a) a housing having a longitudinal axis and means at one end for fluid tight attachment to an upwardly continuing portion of the pipe string and having means at the other end for fluid tight attachment to a downwardly continuing portion of the pipe string and having fluid channel means for conducting said fluid stream between said portions;

(b) a fluid powered turbine in said housing through which at least part of said fluid passes, said turbine comprising at least one stage, each stage having one rotor and one stator, said stator being fixedly attached to said housing, said rotor situated downstream of said stator and carried by an arbor, said arbor bearingly supported for rotation about said longitudinal axis of said housing, said arbor being axially movable to vary the distance between said stator and said rotor, said rotor and said stator having salient power vanes extending therefrom and defining an annular flow path for said fluid stream therebetween, said power vanes peripherally distributed such that rotational increments of said rotor place said rotor power vanes in streamline registry with said stator vanes to produce minimum flow resistance and minimum pressure drop across said turbine, while approximately half-increments of rotor rotation place said rotor power vanes in a maximum flow interference relationship with said stator vanes to produce maximum flow interference and maximum pressure drop across said turbine;

(c) rotation control means operably connected to said rotor and being responsive to said signals from said downhole instrument, to define rotational positions and change of said positions relative to said stator to produce said time distributed fluid pressure signals in said fluid stream characteristic of the encoded message to be transmitted to the surface.

12. The apparatus of claim 11 wherein said rotation control means comprises an escapement tub attached to said arbor having a first plurality of teeth corresponding to said increments and a second plurality of teeth corresponding to said half-increments, a pawl carrier supported by said housing and being movable between a first position to interfere with said first plurality of teeth and a second position to interfere with said second plurality of teeth, and actuator means responsive to said signals from said downhole instrument to move said pawl carrier between said first and said second positions.

13. The apparatus of claim 11 wherein said rotation control means comprises a load means operably associated with said arbor, said load means being responsive to signals from said downhole instrument, to define the rotational speed and positions of said arbor carrying said rotor relative to said stator.

14. Apparatus for use in a pipe string suspended in a well with a drilling fluid flowing through said pipe string, said apparatus generating time distributed fluid pressure signals in said drilling fluid for detection at the surface of said well in response to signals from a downhole instrument, said apparatus comprising:

(a) an outer housing defining a central bore through which at least a portion of said drilling fluid flows;

(b) a stator located within said central bore of said housing, said stator having a plurality of stator turbine blades projecting radially therefrom, said stator turbine blades being attached to said outer housing;

(c) a rotor rotationally mounted within said central bore of said outer housing adjacent to said stator, said rotor having a plurality of rotor turbine blades projecting radially therefrom, said stator turbine blades and said rotor turbine blades being cooperatively arranged to urge said rotor to rotate when said drilling fluid flows through said stator turbine blades and said rotor turbine blades, said rotation of said rotor turbine blades placing said rotor turbine blades and said stator turbine blades in streamline registration with one another while further rotation of said rotor turbine blades places said rotor turbine blades and said stator turbine blades in streamline interference with one another; and (d) means responsive to said signals from said downhole instrument for releasably latching said rotor in a first position corresponding to said streamline registration and in a second position corresponding to said streamline interference, thereby generating said time distributed fluid pressure signals in said drilling fluid.

15. The apparatus recited in claim 14 wherein said rotor is axially movable toward and away from said stator.

16. The apparatus recited in claim 15 wherein said rotor is biased toward said stator.

17. The apparatus recited in claim 14 wherein said latching means comprises:

(e) an escapement tube attached to said rotor, said escapement tub having an upper set of teeth and a lower set of teeth on its inner surface;

(f) an escapement pawl carrier located within said escapement tub and being axially moveable between and upper position and a lower position, said escapement pawl carrier having an upper set of pawls and a lower set of pawls; and (g) means for axially moving said escapement pawl carrier between said upper position and said lower position, said upper set of escapement tub teeth latching with said upper set of escapement pawl carrier pawls in said upper position, and said lower set of escapement tub teeth latching with said lower set of escapement pawl carrier pawls in said lower position.

* * * * *